(12) United States Patent
Ushijima

(10) Patent No.: US 9,159,966 B2
(45) Date of Patent: Oct. 13, 2015

(54) BATTERY CASE

(75) Inventor: Osamu Ushijima, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 632 days.

(21) Appl. No.: 13/421,766

(22) Filed: Mar. 15, 2012

(65) Prior Publication Data

US 2012/0244422 A1    Sep. 27, 2012

(30) Foreign Application Priority Data

Mar. 24, 2011    (JP) .................... 2011-066592

(51) Int. Cl.
    H01M 2/02    (2006.01)
    H01M 2/10    (2006.01)
    H01M 10/052    (2010.01)

(52) U.S. Cl.
    CPC .......... H01M 2/1016 (2013.01); H01M 2/1094 (2013.01); *H01M 10/052* (2013.01)

(58) Field of Classification Search
    CPC ..... H01M 2/08; H01M 2/04; H01M 2/04952; H01M 2/1016; H01M 2/052; H01M 2/1094
    USPC .......................................... 429/163, 185, 176
    See application file for complete search history.

(56) References Cited

U.S. PATENT DOCUMENTS

| | | | |
|---|---|---|---|
| 2004/0253506 A1* | 12/2004 | Urade et al. | 429/56 |
| 2007/0154785 A1* | 7/2007 | Seo et al. | 429/61 |
| 2009/0305125 A1 | 12/2009 | Kosugi et al. | |
| 2010/0136402 A1* | 6/2010 | Hermann et al. | 429/120 |
| 2010/0227217 A1* | 9/2010 | Fujikawa et al. | 429/185 |
| 2011/0171507 A1* | 7/2011 | Kim | 429/94 |

FOREIGN PATENT DOCUMENTS

| | | |
|---|---|---|
| JP | 3089245 U | 10/2002 |
| JP | 2005 108750 A | 4/2005 |
| JP | 2007-200758 A | 8/2007 |

OTHER PUBLICATIONS

Notification of Reasons for Refusal dated Aug. 19, 2014 for Japanese Patent Application No. 2011-066592 with English Translation.

* cited by examiner

*Primary Examiner* — Jonathan Jelsma
*Assistant Examiner* — Rashid Alam
(74) *Attorney, Agent, or Firm* — McGinn IP Law Group, PLLC.

(57) ABSTRACT

The present invention provides a battery case configured by fixing a joined portion where plate sections overlap with each other using a fixation member, and two different types of sealing members are disposed at the joined portion. It is possible to ensure high sealing properties by using sealing members suitable for the respective shapes of portions of the joined portion.

18 Claims, 11 Drawing Sheets

BATTERY CASE

BACKGROUND OF THE INVENTION

1. Field of the Invention

The present invention relates to battery cases, and in particular, to a battery case having plate sections fixed to each other by a fixation member.

2. Description of the Related Art

JP-A-2007-200758 discloses a metal case (battery case) in which cells are stored. The metal case includes a case body (battery case body) and a cap plate (cap body) that are joined each other by screws, as well as a sealing member provided between the case body and the cap plate. Further, JP-A-2007-200758 also describes that the case body is made of a material such as iron or aluminum. In this case, as welding an aluminum material is difficult as compared to a material such as iron, a case body made of an aluminum material is often provided by jointing the material using fixation members such as rivets.

However, as compared to welding, forming a case body by jointing a material using fixation members is susceptible to gaps, and thus provides lower sealing functionality. Consequently, a problem of failing to ensure high sealing functionality of the case body is envisaged. Especially, in the aerospace fields, safety against leakage of organic electrolyte solutions of nonaqueous electrolyte cells (such as lithium ion cells) is highly demanded, and ensuring high sealing functionality is essential in such fields.

SUMMARY OF THE INVENTION

The present invention has been contrived in order to address the above problem, and an object of the present invention is to provide a battery case having high sealing functionality.

A first aspect of the present invention provides a battery case including: a joined portion where plate sections overlap with each other and are fixed by a fixation member; a first sealing member; and a second sealing member, wherein the first sealing member and the second sealing member are different from each other and are disposed at the joined portion.

According to the first aspect of the present invention, it is possible to ensure high sealing functionality by disposing the first sealing member and the second sealing member suitable for the respective portions of the joined portion where the plate sections overlap with each other, as compared to a case in which only one type of sealing member is used. Consequently, even in the case in which an electrolyte solution leaks from cells stored in the case, it is possible to effectively suppress leakage of the electrolyte solution from the battery case.

According to the first aspect of the present invention, preferably, the first sealing member is disposed between joining surfaces of the joined portion, and the second sealing member includes a paste sealing member, and is disposed so as to cover an end of the joining surface. By disposing the first sealing member between the joining surfaces and the paste second sealing member at the end of the joining surfaces, it is possible to seal the case at two positions: between the joining surfaces of the joined portion, and the end of the joining surfaces, and to improve the sealing functionality of the battery case.

A second aspect of the present invention provides a battery case including: a plate member being bent; notch portions each disposed at an end of a folded portion at which the plate member is bent; and a closure-sealing member covering each of the notch portions.

According to the second aspect of the present invention, the battery case is provided by bending the plate member, the notch portions are each disposed at the end of the folded portion, and the closure-sealing member covering each of the notch portions is provided. With such a configuration, the notch portions are covered using the closure-sealing members, and even in the case in which the electrolyte solution leaks from the cells stored in the case, it is possible to effectively suppress leakage of the electrolyte solution from the battery case.

According to the first and the second aspects of the present invention, a gasket sealing member can be provided at an engaging portion between the battery case body and a cap body for covering an opening of the battery case body. With such a configuration, even when the removable cap body is provided, it is possible to facilitate the sealing between the battery case body and the cap body by the gasket sealing member. Therefore, even in the case in which the electrolyte solution leaks from the cells, it is possible to suppress leakage of the electrolyte solution through a portion between the battery case body and the cap body.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION OF THE INVENTION

A preferred embodiment of the present invention will now be described hereinafter with reference to the drawings. First, a battery case 100 according to the embodiment will be described with reference to FIG. 1 to FIG. 6.

Figure 1:
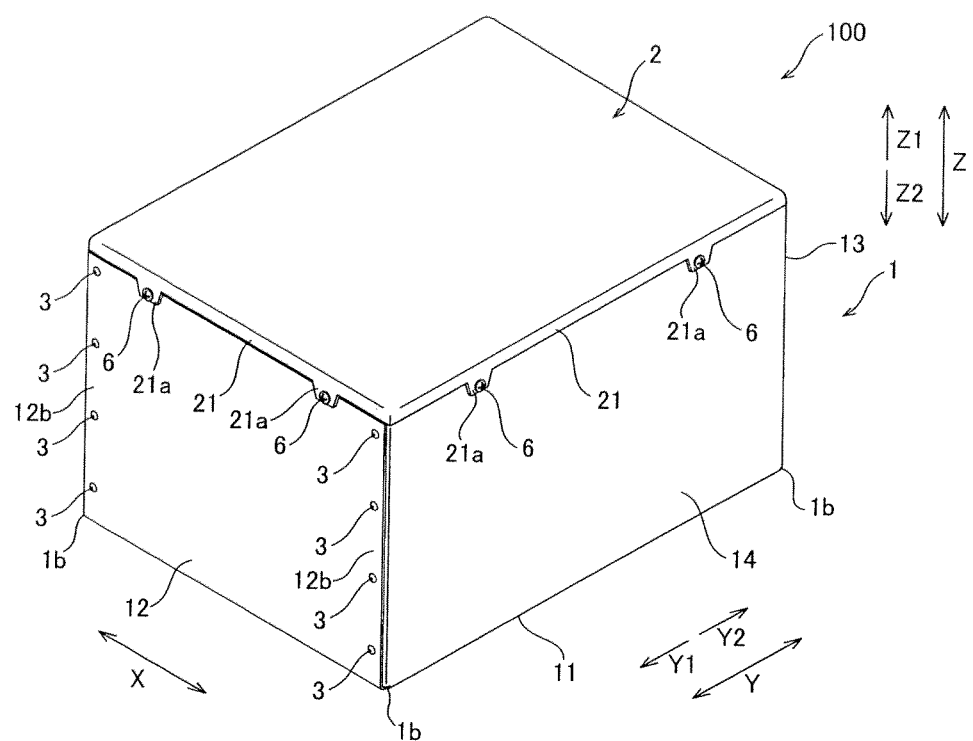
FIG. 1 shows a perspective view illustrating a battery case according to one embodiment of the present invention.
Figure 2:
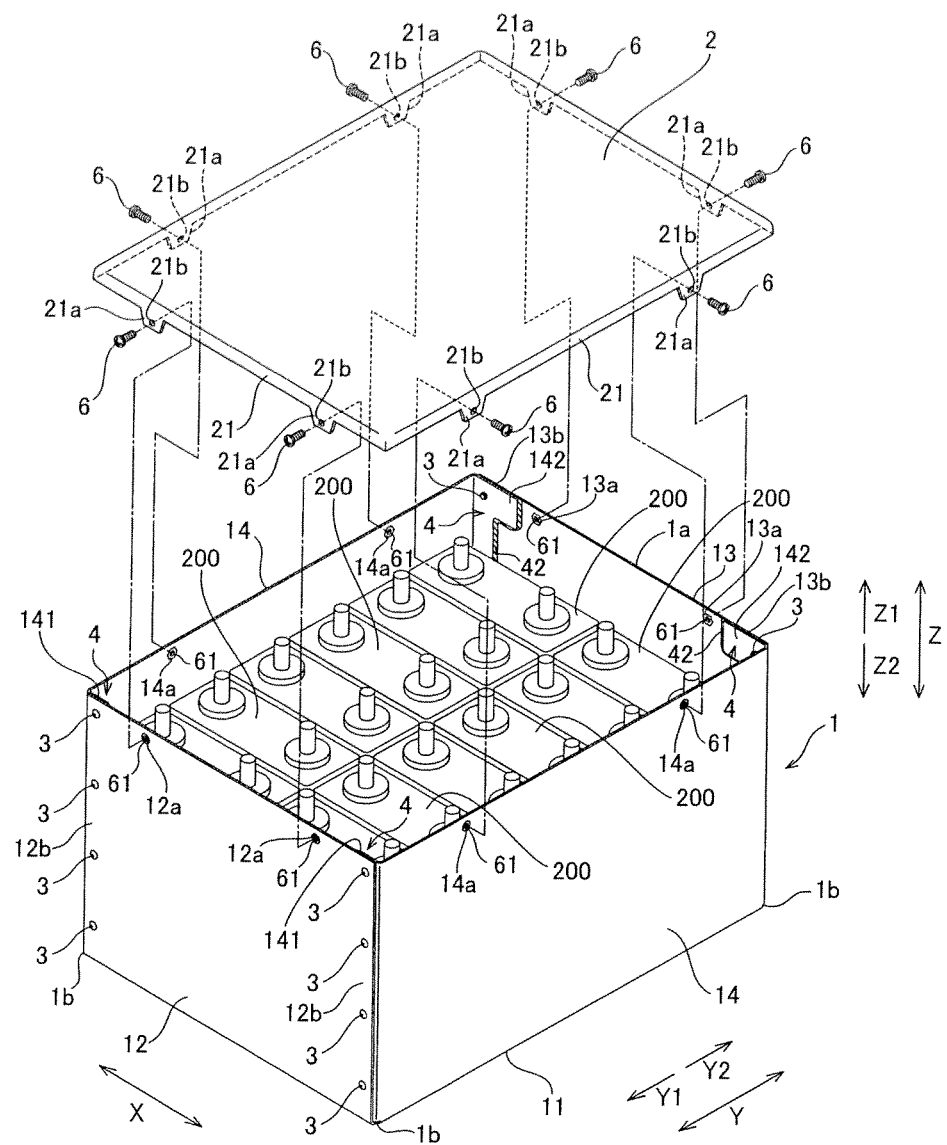
FIG. 2 shows an exploded perspective view illustrating the battery case according to the embodiment.

Referring to FIG. 1 and FIG. 2, the battery case 100 according to the embodiment is provided with a battery case body 1 in a box shape, and a cap body 2 covering an opening 1a of the battery case body 1.

The battery case body 1 is formed in the box shape by bending a plated material made of an aluminum alloy. It is possible to reduce the weight of the battery case 100 by using an aluminum alloy as the material of the battery case body 1. As illustrated in FIG. 1 and FIG. 2, the battery case body 1 includes a bottom section 11, and a front section 12, a back section 13, and two side sections 14 that are respectively coupled to four sides of the bottom section 11. The battery case body 1 stores twelve square-shaped lithium ion cells 200. In addition, the front section 12, the back section 13, and the side sections 14 are provided with nuts 61 at positions corresponding to holes 21b of the cap body 2.

Further, the front section 12 and the two side sections 14 of the battery case body 1 are rivet-jointed (fixed) by rivets 3. Specifically, as illustrated in FIG. 2, each of the side sections 14 is provided with a plate-shaped overlap margin 141 on its end, and each end 12b of the front section 12 and the overlap margin 141 of the side section 14 in an overlapped state are rivet-jointed by the rivets 3. Each rivet 3 is inserted through the holes 121 and 141a that are respectively provided in each end 12b of the front section 12 and the overlap margin 141 of the side section 14 to rivet-joint the end 12b of the front section 12 and the overlap margin 141 of the side section 14 (see FIG. 4). In this manner, joined portions 4 are formed by joining the both ends 12b of the front section 12 and the overlap margins 141 of the side sections 14. The rivets 3 are one example of a "fixation member" according to the present invention. Additionally, the front section 12, the back section 13, the overlap margins 141, and overlap margins 142 are one example of "plate sections" according to the present invention.

Figure 3:
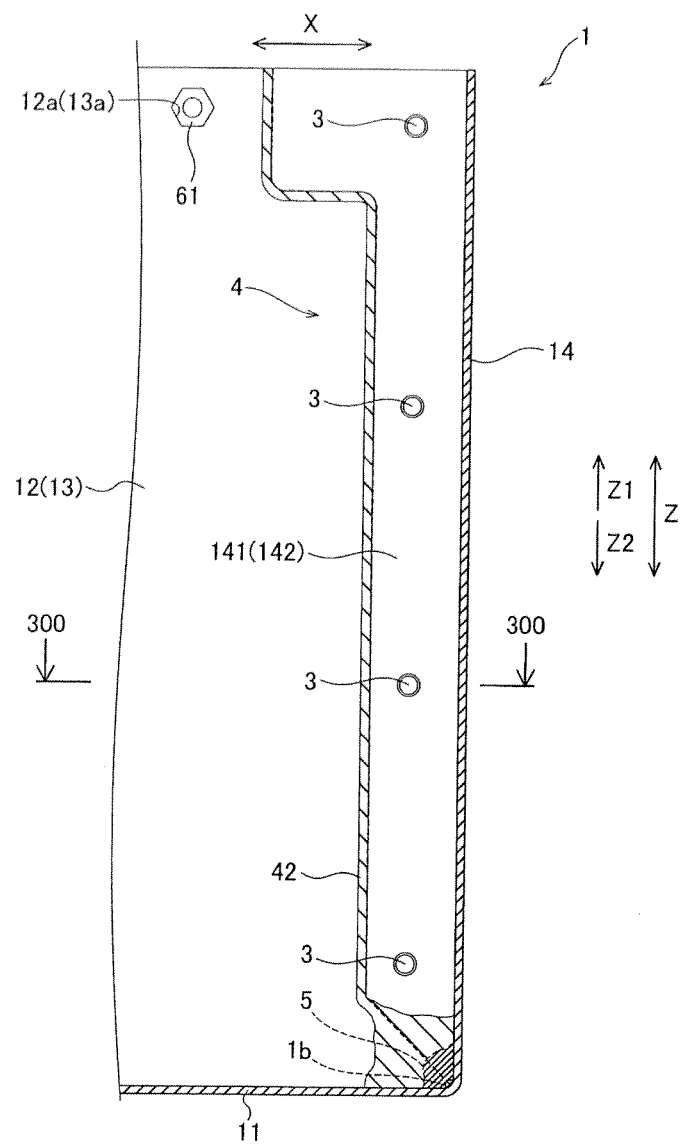
FIG. 3 shows a partial cross-sectional view illustrating a joined portion of the battery case according to the embodiment.

Further, the overlap margins 141 are in the same shape, and, as illustrated in FIG. 3, each overlap margin 141 is provided so as to extend vertically from a top end to a bottom end of each side section 14 (Z direction). Moreover, a top end of each overlap margin 141 is provided so as to have a greater width in the X direction than a center of the overlap margin 141.

Figure 4:
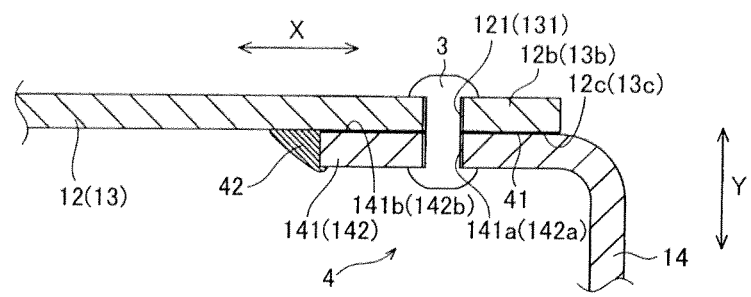
FIG. 4 shows a cross-sectional view taken along line 300-300 in FIG. 3.

As illustrated in FIG. 4, according to this embodiment, the joined portion 4 between the front section 12 and the side section 14 is provided with a liquid sealing member 41 and a paste sealing member 42. The liquid sealing member 41 is made of a liquid material composed mainly of an olefin-based hydrocarbon having a high resistance to electrolyte solutions, and hardened into a rubber-like elastic body by volatilization of a solvent included in the sealing member. As illustrated in FIG. 4, the liquid sealing member 41 is provided between joining surfaces of the joined portion 4. Specifically, the liquid sealing member 41 is provided between an inner surface 12c of the both ends 12b of the front section 12 and an outer surface 141b of the overlap margin 141 of the side section 14 (between the joining surfaces). Further, the liquid sealing member 41 is provided continuously between the joining surfaces of the joined portion 4 from a portion near an upper end to a portion near a lower end of the battery case body 1. Here, the liquid sealing member 41 is one example of a "first sealing member" according to the present invention.

Further, the paste sealing member 42 is made of a paste material composed mainly of a silyl group-containing polymer having a high resistance to electrolyte solutions, and hardened into an elastic body by a reaction with water in the air. As illustrated in FIG. 3 and FIG. 4, the paste sealing member 42 is provided so as to cover an end of the joined portion 4 across the X direction within the battery case body 1. Specifically, as illustrated in FIG. 4, the paste sealing member 42 is provided so as to cover a stepped portion configured by the front section 12 and the overlap margin 141. In FIG. 4, the paste sealing member 42 is provided so as to cover the entire stepped portion. However, the paste sealing member 42 can provide the effect of the present invention as long as it covers the end between the joining surfaces. Further, as illustrated in FIG. 3, the paste sealing member 42 is provided continuously along the shape of the end of the overlap margin 141 from the portion near the upper end to the portion near the lower end of the battery case body 1. Here, the paste sealing member 42 is one example of a "second sealing member" according to the present invention.

As illustrated in FIG. 1 to FIG. 3, the bottom section 11 of the battery case body 1 includes a notch hole 1b at each of four corners for in order to reduce stress concentration when bending the front section 12, the back section 13, and the two side sections 14. Here, the notch hole 1b is one example of a "notch portion" according to the present invention. The notch hole 1b is provided with a putty 5 so as to cover the notch hole 1b, and the putty 5 is made of a material composed mainly of an epoxy-based resin. As silyl group-containing polymers have a higher resistance to electrolyte solutions than epoxy-based resins, it is possible to suppress dissolution of the putty 5 by providing the paste sealing member 42 composed mainly of a silyl group-containing polymer so as to cover the putty 5 composed mainly of an epoxy-based resin. Here, the putty 5 is one example of a "closure-sealing member" according to the present invention.

Figure 5:
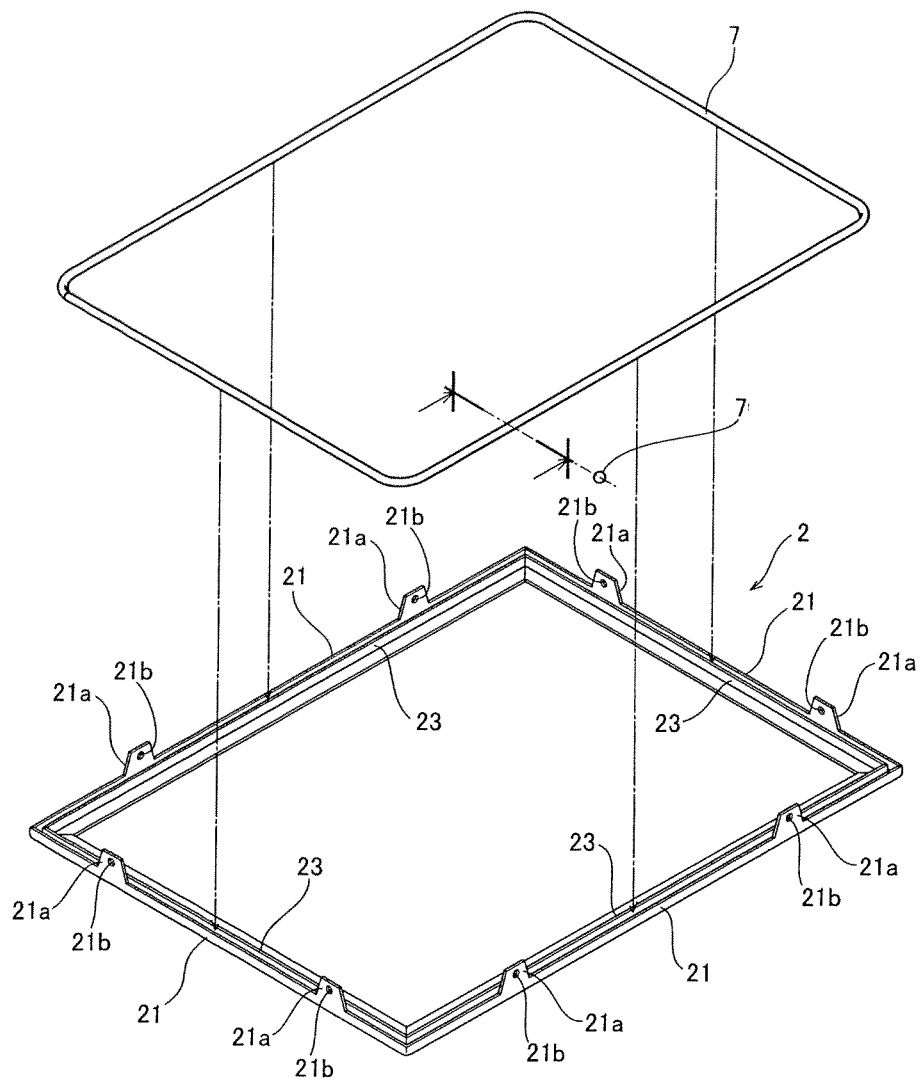
FIG. 5 shows a perspective view illustrating an interior of a cap body of the battery case according to the embodiment.
Figure 6:
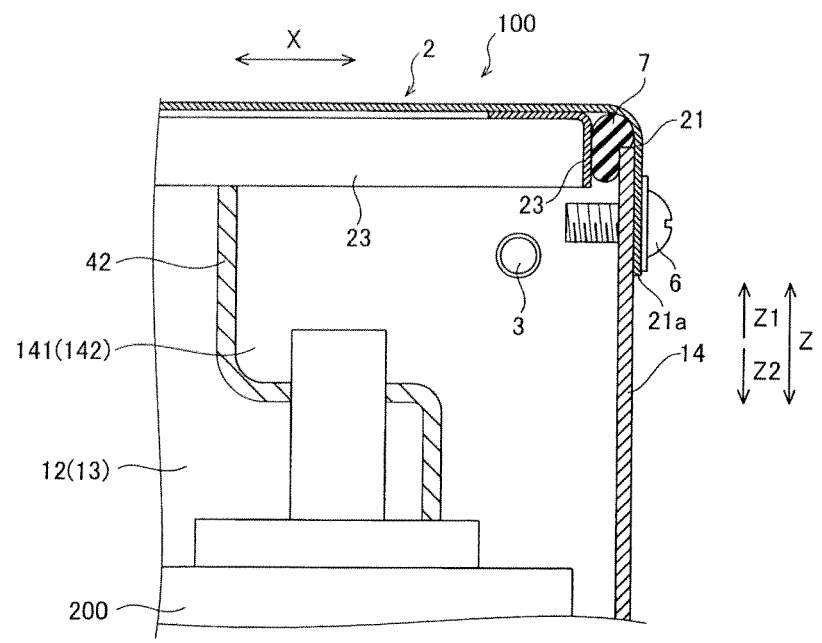
FIG. 6 shows a cross-sectional view illustrating an engaging portion between the cap body and a battery case body according to the embodiment.

The cap body 2 is made of a plate member of an aluminum alloy, which is the same material as that of the battery case body 1. As illustrated in FIG. 5, the cap body 2 includes a side wall 21 provided by bending sides of the cap body 2. The cap body 2 is also provided with an opposing wall 23 so as to face toward the side wall 21. As illustrated in FIG. 6, the upper end of the battery case body 1 is inserted between the side wall 21 and the opposing wall 23 of the cap body 2. The cap body 2 is removably attached to the battery case body 1 by screwing screws 6 with the nuts 61 of he battery case body 1 via the hole 21b (see FIG. 2 and FIG. 5).

As illustrated in FIG. 5 to FIG. 6, a gasket 7 is provided between the side wall 21 and the opposing wall 23. The gasket 7 is made of a silicon sponge having a circular cross-section, and is elastically deformable. The gasket 7 is provided so as to be sandwiched between the cap body 2 and the battery case body 1. Specifically, upon attachment of the cap body 2 to the battery case body 1, the gasket 7 deforms by being pressed between a portion between the side wall 21 and the opposing wall 23 of the cap body 2 and the upper end of the battery case body 1.

Next, a method of manufacturing the battery case 100 according to the embodiment will be described with reference to FIG. 1 to FIG. 11.

Figure 7:
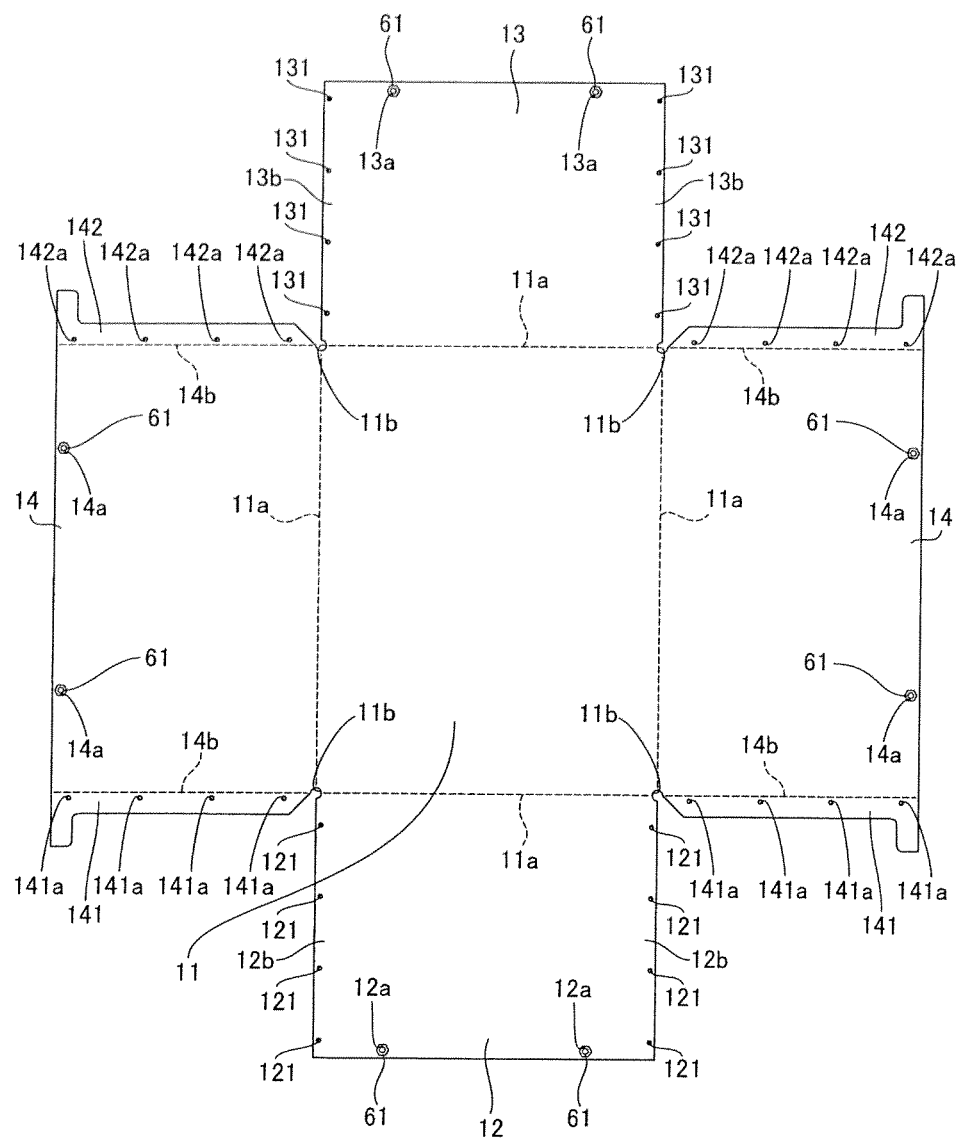
FIG. 7 shows a plan view of the battery case body according to the embodiment before bending.
Figure 8:
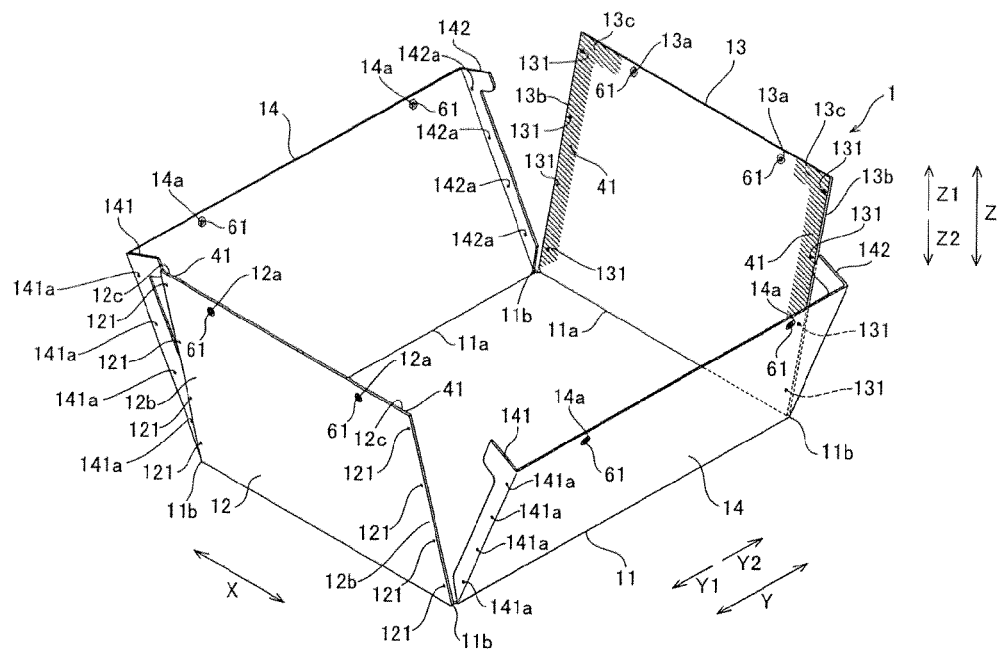
FIG. 8 shows a perspective view for explaining a step of applying a liquid sealing member according to the embodiment.

First, the overlap margins 141 and 142 of the plate member of an aluminum alloy illustrated in FIG. 7 are bent inward respectively along folding lines 14b. Then, the front section 12, the back section 13, and the side sections 14 are bent upward respectively along folding lines 11a (lines indicated by dashed lines). This results in a state as illustrated in FIG. 8. At this time, as notches 1ib in a circular arc are provided at both ends of each folding line 11a, stress concentration due to bending of the plate member can be reduced. The notches 11b are portions that correspond to the notch holes 1b after the battery case body 1 is assembled.

Figure 9:
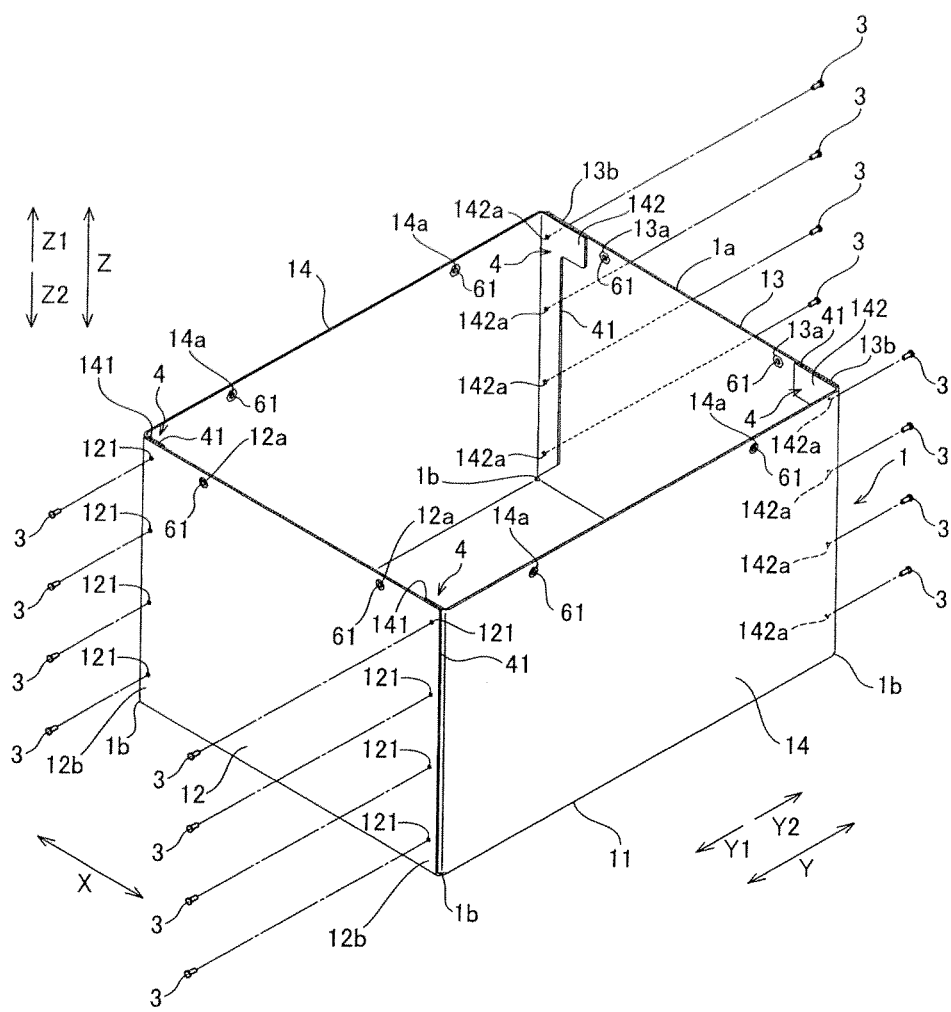
FIG. 9 shows a perspective view for explaining a step of rivet-jointing according to the embodiment.

Thereafter, the liquid sealing member 41 is provided between the joining surfaces of each of the joined portions 4 between the front section 12 and the side sections 14. Specifically, as illustrated in FIG. 8, the liquid sealing member 41 is applied to an area corresponding to each of the inner surfaces 12c of the front section 12. Then, the front section 12, the back section 13, and the side section 14 are further bent to provide a state as illustrated in FIG. 9. Thereafter, the rivets 3 are inserted through the holes 121 in the front section 12 and the holes 141a in the side sections 14, and whereby the front section 12 is rivet-jointed with the overlap margins 141. After the rivet-jointing, each liquid sealing member 41 is hardened into a rubber-like elastic body by volatilization of the solvent included in the sealing member.

Figure 10:
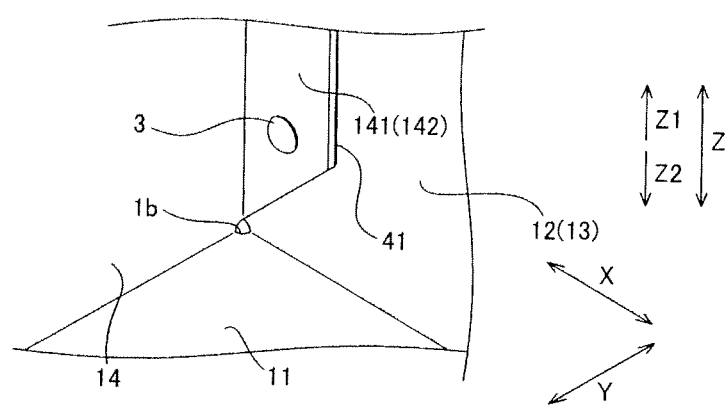
FIG. 10 shows a perspective view for explaining a step of covering a notch hole with a putty and a paste sealing member according to the embodiment.
Figure 10:
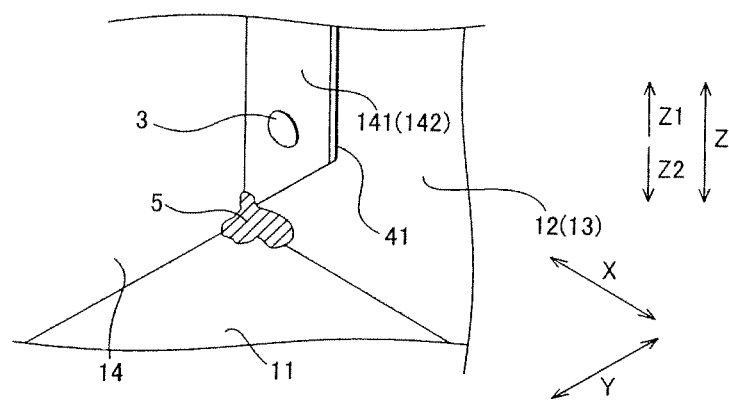
Figure 10:
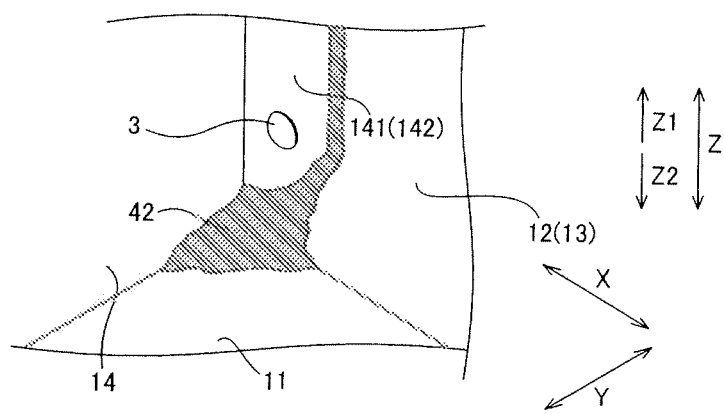

In this state, the putty 5 is applied within the battery case body 1 so as to cover each of the notch holes 1b at the four corners of the battery case body 1, as illustrated in FIG. 10. The putty 5 includes a base compound and a hardening agent, and can be hardened by mixing the base compound and the hardening agent at a predetermined proportion. Similarly, the back section 13 and the side sections 14 are rivet-jointed after application of the liquid sealing members 41, and the putty 5 is applied so as to cover each notch portion 1b.

Figure 11:
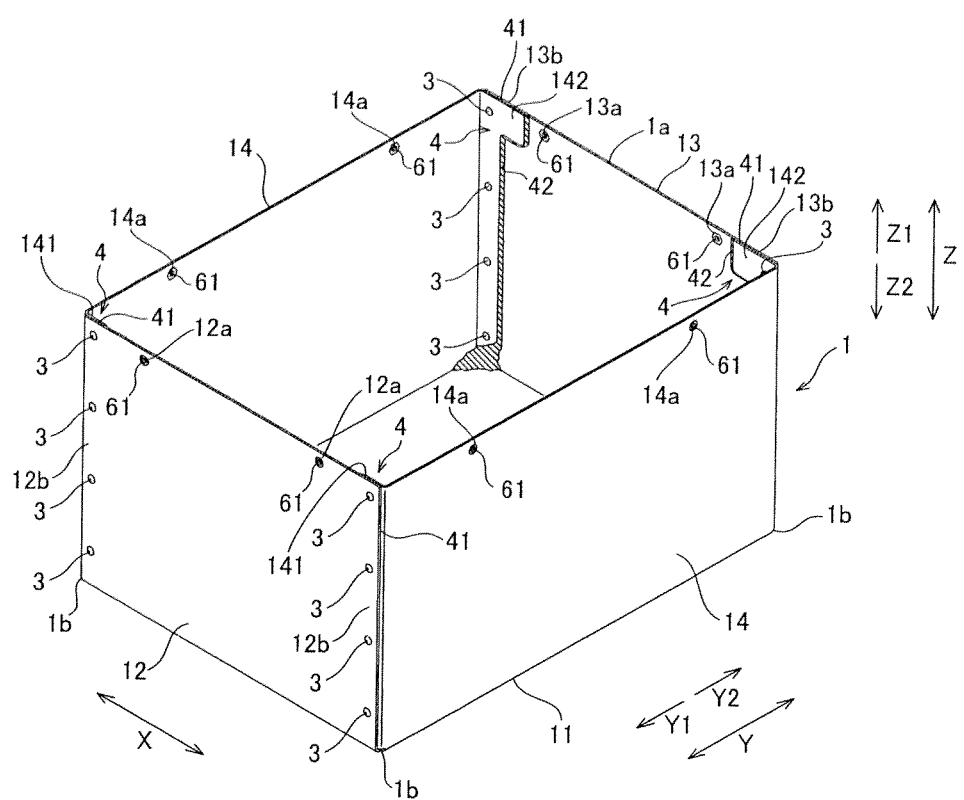
FIG. 11 shows a perspective view for explaining a step of applying the paste sealing member according to the embodiment.

Then, as illustrated in FIG. 3, FIG. 4, and FIG. 11, the paste sealing member 42 is applied within the battery case body 1 so as to cover an end of each joined portion 4. At this time, as illustrated in FIG. 3 and FIG. 11, the paste sealing member 42 is applied continuously from an upper end to a lower end of an end along the overlap margin 141. Further, as illustrated in FIG. 10, the paste sealing member 42 is applied so as to cover each of the putties 5 at the four corners of the battery case body 1 on the side of the bottom section 11. Thereafter, each paste sealing member 42 is hardened into an elastic body by a reaction with water in the air. Similarly, the paste sealing members 42 are applied between the back section 13 and the side sections 14, in the same manner.

Then, after the twelve lithium ion cells 200 are stored within the battery case body 1, the cap body 2 is attached to the opening 1a of the battery case body 1 by the screws 6. At this time, as illustrated in FIG. 5, the gasket 7 is fitted between the side wall 21 and the opposing wall 23 of the cap body 2, and then the cap body 2 is attached to the battery case body 1 by the screws 6. In this manner, the battery case 100 according to the embodiment is manufactured.

According to this embodiment, it is possible to ensure high sealing functionality by using the liquid sealing member 41 suitable for the shape between the joining surfaces of the joined portion 4 of the battery case body 1 and the paste sealing member 42 suitable for the shape of the ends of the joining surfaces, as compared to the case in which only one type of sealing member is used. With this, even in the case in which an electrolyte solution leaks from the lithium ion cell 200, it is possible to effectively suppress leakage of the electrolyte solution from the battery case body 1.

Further, according to this embodiment, the notch holes 1b for reducing stress concentration due to bending of the plate member are provided at the ends of the folding portions of the battery case body 1, and then the putties 5 made of an epoxy-based resin are provided so as to cover the notch holes 1b. With such a configuration, even when the notch holes 1b are provided, it is possible to cover the notch holes 1b by the putties 5, and to ensure the sealing functionality of the battery case body 1.

Moreover, according to this embodiment, the gasket 7 is provided at the engaging portion between the battery case body 1 and the cap body 2. With such a configuration, even when the removable cap body 2 is provided, it is possible to facilitate the sealing between the battery case body 1 and the cap body 2 by the gasket 7, and to suppress leakage of the electrolyte solution through a portion between the battery case body 1 and the cap body 2.

It would be understood that the embodiment disclosed herein is in all respects exemplary and non-limiting. The present invention is defined by the scope of the appended claims, and includes any modifications made without departing from the scope of the present invention and equivalents thereto.

For example, while the embodiment describes the example in which the joined portion is fixed using the rivets as the fixation members, the joined portion can be fixed using the fixation members such as screws instead of the rivets in the present invention.

While the embodiment describes the example in which the material of the battery case body is an aluminum alloy, the battery case body can be made of a metallic material other than an aluminum alloy in the present invention. It is also possible to reduce the weight of the battery case using a magnesium alloy and the like.

While the embodiment describes the example in which the liquid material composed mainly of an olefin-based hydrocarbon is used for the first sealing member and the paste material composed mainly of a silyl group-containing polymer is used for the second sealing member, the materials of the sealing members are not limited to the above examples. It is possible to use a material composed mainly of, for example, a silicon-based compound or an epoxy-based compound. For the first sealing member, it is preferable to use a liquid material that can be applied in a thin layer. Further, for the first sealing member and for the second sealing member, it is preferable to use a material having a high resistance to electrolyte solutions.

While the embodiment describes the example in which the closure-sealing member is made of an epoxy-based resin, the closure-sealing member can be made of a material other than the epoxy-based resin. Additionally, the closure-sealing member can be one of the first sealing member and the second sealing member.

While the embodiment describes the example in which the battery case body in the box shape is provided by bending a single plate member, the battery case body can be provided by assembling a plurality of separate plate members in the present invention.

While the embodiment describes the example in which the battery case stores lithium ion cells, the battery case according to the present invention can store nonaqueous electrolyte cells other than the lithium ion cells, or nickel-metal hydride cells.

While the embodiment describes the example in which the first sealing member and the second sealing member are provided entirely from the portion near the upper end to the portion near the lower end of the battery case body, the first sealing member and the second sealing member can be provided only in a bottom region including the lower end in the present invention.

What is claimed is:
1. A battery module, comprising:
a plurality of nonaqueous electrolyte cells; and
a battery case in which the plurality of nonaqueous electrolyte cells are housed, the battery case including:
a first section including a first opposed surface;
a second section provided with a plate-shaped overlap margin on an end of the second portion, the overlap margin including a second opposed surface opposed to the first opposed surface and an end surface being perpendicular to the second opposed surface;

a fixation member which attaches the first section to the overlap margin;
a first sealing member; and
a second sealing member,
wherein the first opposed surface is in direct contact with one surface of the first sealing member,
wherein the second opposed surface is in direct contact with another surface of the first sealing member,
wherein the second sealing member is in direct contact with the first opposed surface and the end surface of the overlap margin, and
wherein the first sealing member and the second sealing member are different from each other.

2. The battery module according to claim 1, wherein the second sealing member includes a paste sealing member.

3. The battery module according to claim 2, wherein the first sealing member comprises a liquid material composed mainly of an olefin-based hydrocarbon, and
wherein the second sealing member comprises a paste material composed mainly of a silyl group-containing polymer.

4. The battery module according to claim 1, further comprising:
a plate member being bent;
notch holes each disposed at an end of a folded portion at which the plate member is bent; and
a closure-sealing member covering each of the notch holes.

5. The battery module according to claim 4, wherein the closure-sealing member comprises an epoxy-based resin.

6. The battery module according to claim 1, wherein the fixation member penetrates the first section and the second section.

7. The battery module according to claim 1, wherein the end surface is perpendicular to the first opposed surface.

8. The battery module according to claim 1, wherein the fixation member extends above an upper surface of the first section and below a bottom surface of the second section to attach the first section to the second section.

9. The battery module according to claim 8, wherein the fixation member comprises a rivet that penetrates the first section and the second section.

10. A battery case in which a plurality of electrolyte cells are housed, the battery case comprising:
a first section including a first opposed surface;
a second section provided with a plate-shaped overlap margin on an end of the second portion, the overlap margin including a second opposed surface opposed to the first opposed surface and an end surface being perpendicular to the second opposed surface;
a fixation member which attaches the first section to the overlap margin;
a first sealing member; and
a second sealing member,
wherein the first opposed surface is in direct contact with one surface of the first sealing member,
wherein the second opposed surface is in direct contact with another surface of the first sealing member, and
wherein the second sealing member is in direct contact with the first opposed surface and the end surface of the overlap margin.

11. The battery case according to claim 10, wherein the fixation member penetrates the first section and the second section.

12. The battery case according to claim 10, further comprising:
a plate member being bent; and
notch holes each disposed at an end of a folded portion at which the plate member is bent.

13. The battery case according to claim 12, further comprising:
a closure-sealing member covering each of the notch holes.

14. The battery case according to claim 10, wherein the second sealing member includes a paste sealing member,
wherein the first sealing member comprises a liquid material composed mainly of an olefin-based hydrocarbon, and
wherein the second sealing member comprises a paste material composed mainly of a silyl group-containing polymer.

15. The battery case according to claim 10, wherein the first sealing member and the second sealing member are different from each other.

16. The battery case according to claim 10, wherein the end surface is perpendicular to the first opposed surface.

17. The battery case according to claim 10, wherein the fixation member extends above an upper surface of the first section and below a bottom surface of the second section to attach the first section to the second section.

18. The battery case according to claim 17, wherein the fixation member comprises a rivet that penetrates the first section and the second section.

* * * * *